US012603432B2

(12) United States Patent
Nam et al.

(10) Patent No.: US 12,603,432 B2
(45) Date of Patent: Apr. 14, 2026

(54) ANTENNA AND WEARABLE ELECTRONIC DEVICE INCLUDING SAME ANTENNA

(71) Applicants: Samsung Electronics Co., Ltd., Suwon-si (KR); INDUSTRY-ACADEMIC COOPERATION FOUNDATION YONSEI UNIVERSITY, Seoul (KR)

(72) Inventors: Yongsik Nam, Suwon-si (KR); Taehyun Woo, Suwon-si (KR); Youngjoong Yoon, Seoul (KR); Donghyun Kim, Seoul (KR); Chanyeong Park, Seoul (KR); Myeounghyeoun Do, Suwon-si (KR); Taegyeong Han, Suwon-si (KR)

(73) Assignees: Samsung Electronics Co., Ltd., Suwon-si (KR); INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 56 days.

(21) Appl. No.: 18/640,585

(22) Filed: Apr. 19, 2024

(65) Prior Publication Data

US 2024/0266740 A1 Aug. 8, 2024

Related U.S. Application Data

(63) Continuation of application No. PCT/KR2022/015403, filed on Oct. 12, 2022.

(30) Foreign Application Priority Data

Dec. 9, 2021 (KR) ........................ 10-2021-0175406

(51) Int. Cl.

*H01Q 7/00* (2006.01)
*H01Q 1/22* (2006.01)

(Continued)

(52) U.S. Cl.

CPC ............ *H01Q 7/00* (2013.01); *H01Q 1/2291* (2013.01); *H01Q 1/273* (2013.01); *H01Q 5/25* (2015.01)

(58) Field of Classification Search

None

See application file for complete search history.

(56) References Cited

U.S. PATENT DOCUMENTS 7,423,598 B2 9/2008 Bit-Babik et al.
8,654,020 B2 2/2014 Kim et al.

(Continued)

FOREIGN PATENT DOCUMENTS

CN 104659493 A 5/2015
CN 105428805 A 3/2016

(Continued)

OTHER PUBLICATIONS

International Search Report dated Jan. 27, 2023, issued in International Application No. PCT/KR2022/015403.

*Primary Examiner* — Crystal L Hammond
(74) *Attorney, Agent, or Firm* — Jefferson IP Law, LLP

(57) ABSTRACT

A wearable electronic device is provided. The wearable electronic device includes a housing, a printed circuit board disposed inside the housing and including wireless communication circuitry and a ground part, and an antenna disposed inside the housing and electrically connected to the wireless communication circuitry, wherein the antenna includes a conductive pattern, a feeding member electrically connected to the wireless communication circuitry through a feeding point and configured to electrically connect a first point of the conductive pattern and a first point of the ground part, a short-circuit member configured to electrically connect a second point of the conductive pattern and a second point of the ground part, and a capacitive loading member disposed between the feeding member and the short-circuit member (Continued)

having a first part operatively coupled to a third point of the conductive pattern and a second part electrically connected to a third point of the ground part.

19 Claims, 14 Drawing Sheets

(51) Int. Cl.

| | |
|---|---|
| ***H01Q 1/27*** | (2006.01) |
| ***H01Q 5/25*** | (2015.01) |

(56) References Cited

U.S. PATENT DOCUMENTS

| | | | | |
|---|---|---|---|---|
| 9,948,003 | B2 | 4/2018 | Harper et al. | |
| 10,516,206 | B2 | 12/2019 | Riisberg | |
| 10,764,666 | B1 * | 9/2020 | Napoles | H01Q 7/00 |
| 2016/0064832 | A1 | 3/2016 | Shin et al. | |
| 2016/0241306 | A1 | 8/2016 | Moon et al. | |
| 2018/0062249 | A1 | 3/2018 | Sung et al. | |
| 2018/0248634 | A1 | 8/2018 | Pascolini et al. | |
| 2019/0165456 | A1 * | 5/2019 | Elghannai | H01Q 7/00 |
| 2020/0091590 | A1 * | 3/2020 | Su | H04B 1/3827 |

FOREIGN PATENT DOCUMENTS

| | | | |
|---|---|---|---|
| KR | 10-2016-0024631 | A | 3/2016 |
| KR | 10-2016-0123202 | A | 10/2016 |
| KR | 10-1698688 | B1 | 1/2017 |
| KR | 10-2018-0024336 | A | 3/2018 |
| KR | 10-2018-0098140 | A | 9/2018 |
| KR | 10-2238605 | B1 | 4/2021 |

* cited by examiner

ANTENNA AND WEARABLE ELECTRONIC DEVICE INCLUDING SAME ANTENNA

CROSS-REFERENCE TO RELATED APPLICATION(S)

This application is a continuation application, claiming priority under § 365(c), of an International application No. PCT/KR2022/015403, filed on Oct. 12, 2022, which is based on and claims the benefit of a Korean patent application number 10-2021-0175406, filed on Dec. 9, 2021, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) SAMSUNG ELECTRONICS CO., LTD., and 2) INDUSTRY-ACADEMIC COOPERATION FOUNDATION YONSEI UNIVERSITY.

BACKGROUND

1. Field

The disclosure relates to an antenna and a wearable electronic device including the antenna.

2. Description of Related Art

The use of electronic devices such as bar-type, foldable-type, rollable-type, or sliding-type smartphones or tablet personal computers (PCs) is increasing.

The electronic devices are being developed into wearable forms in which users may wear to improve portability and accessibility.

For example, the electronic device may include an in-ear type wearable electronic device in which a user may wear on his or her ears.

The above information is presented as background information only to assist with an understanding of the disclosure. No determination has been made, and no assertion is made, as to whether any of the above might be applicable as prior art with regard to the disclosure.

SUMMARY

Wearable electronic devices may include in-ear type wireless earphones (e.g., true wireless stereo (TWS) earphones) worn on the user's ears.

The wearable electronic device (e.g., wireless earphone) may transmit and receive phone calls and various data to and from another electronic device (e.g., smart phone) using wireless communication.

The wearable electronic device may include at least one antenna to perform wireless communication with other electronic devices.

The wearable electronic device may include, for example, a planar inverted F antenna (PIFA) and perform Bluetooth communication with other electronic devices.

The planar inverted F antenna (PIFA) of the wearable electronic device may not support various frequency bands other than a frequency band (e.g., about 2.4 GHz to 2.5 GHz) for Bluetooth communication.

Aspects of the disclosure are to address at least the above-mentioned problems and/or disadvantages and to provide at least the advantages described below. Accordingly, an aspect of the disclosure is to provide an antenna capable of operating in various frequency bands such as a Bluetooth (BT) frequency band (e.g., about 2.4 GHz to 2.5 GHz), a wireless fidelity (Wi-Fi) frequency band (e.g., about 5.1 GHz to 6.1 GHz), and/or an ultra wide band (UWB) frequency band (e.g., about 6.1 GHz to 11 GHz), and an electronic device including the antenna.

Additional aspects will be set forth in part in the description which follows and, in part, will be apparent from the description, or may be learned by practice of the presented embodiments.

In accordance with an aspect of the disclosure, a wearable electronic device is provided. The wearable electronic device includes a housing, a printed circuit board disposed inside the housing and including wireless communication circuitry and a ground part, and an antenna disposed inside the housing and electrically connected to the wireless communication circuitry, wherein the antenna includes a conductive pattern, a feeding member electrically connected to the wireless communication circuitry through a feeding point and configured to electrically connect a first point of the conductive pattern and a first point of the ground part, a short-circuit member configured to electrically connect a second point of the conductive pattern and a second point of the ground part, and a capacitive loading member disposed between the feeding member and the short-circuit member and having a first part operatively coupled to a third point of the conductive pattern and a second part electrically connected to a third point of the ground part.

In accordance with another aspect of the disclosure, an antenna is provided. The antenna includes a conductive pattern, a ground part, a feeding member configured to electrically connect a first point of the conductive pattern and a first point of the ground part and to provide a wireless transmission and reception signal to the conductive pattern through a feeding point, a short-circuit member configured to electrically connect a second point of the conductive pattern and a second point of the ground part, and a capacitive loading member disposed between the feeding member and the short-circuit member and having a first part operatively coupled to a third point of the conductive pattern and a second part electrically connected to a third point of the ground part.

According to various embodiments of the disclosure, by supporting BT, Wi-Fi, and/or UWB frequency bands using a single antenna, true wireless stereo (TWS)-based music streaming, large capacity downloading of various data, and acquisition of local information and/or provision of a broadband service through a repeater can be performed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
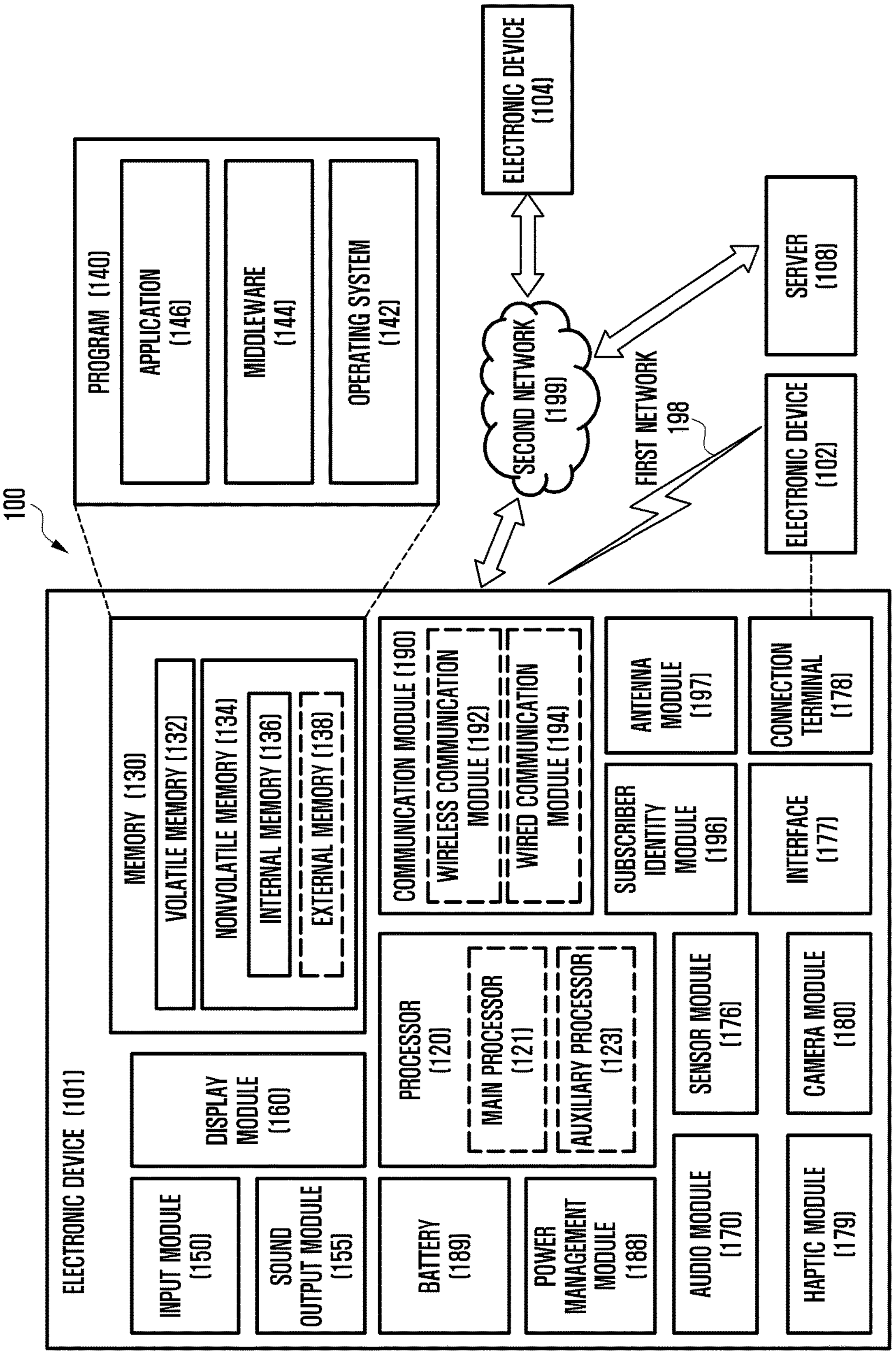
FIG. 1 is a block diagram illustrating an electronic device in a network environment according to an embodiment of the disclosure.

FIG. 1 is a block diagram of an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may, for example, communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134, which may include an internal memory 136 or an external memory 138. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may be configured to output sound signals to the outside of the electronic device 101. The sound output module 155 may include, for example, a speaker or a receiver. The speaker may be used for general purposes, such as playing multimedia or playing record, and the receiver may be used for slide-in calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. In another embodiment, the display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). In another embodiment, the connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may be configured to manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., wireless communication circuitry, a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a $5^{th}$ generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may, for example, support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may, for example, include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input/output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. If the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Figure 2:
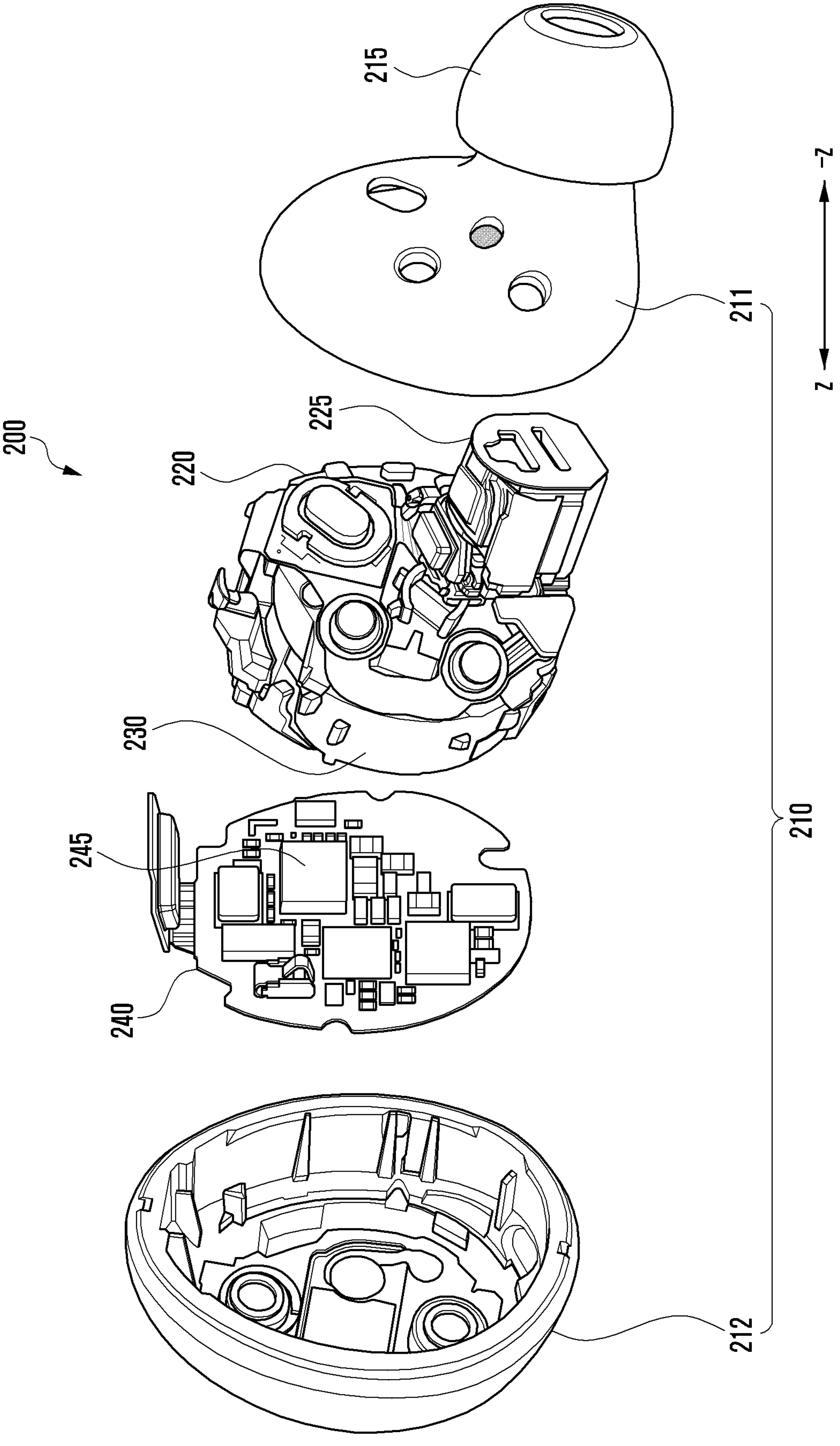
FIG. 2 is an exploded perspective view schematically illustrating a wearable electronic device according to an embodiment of the disclosure.

FIG. 2 is an exploded perspective view schematically illustrating a wearable electronic device according to an embodiment of the disclosure.

A wearable electronic device 200 (e.g., wireless earphone) of FIG. 2 may include at least one component illustrated in the electronic device 101 of FIG. 1.

According to some embodiments, the wearable electronic device 200 according to various embodiments of the disclosure may include a housing 210, a speaker module 220, a battery 230, and/or a printed circuit board 240.

According to an embodiment, the housing 210 may form at least part of an external appearance of the wearable electronic device 200. The housing 210 may include a first housing 211 (e.g., first case) and a second housing 212 (e.g., second case). The first housing 211 may be disposed in, for example, the −z-axis direction. The second housing 212 may be disposed, for example, in the z-axis direction, which is opposite to the −z-axis direction. The first housing 211 and the second housing 212 may be coupled to form the housing 210. The housing 210 may be at least partially formed in a shape that may be worn on the user's ear.

According to another embodiment, the first housing 211 may include an ear tip 215. The ear tip 215 may be detachably coupled to the first housing 211 in a designated direction (e.g., −z-axis direction). The ear tip 215 may be made of an elastic material (e.g., silicone or rubber) of a size that may be inserted into the user's ear (e.g., external auditory canal).

According to still another embodiment, the speaker module 220 (e.g., the sound output module 155 of FIG. 1) may be disposed inside the housing 210. For example, at least a portion of the speaker module 220 may be disposed inside the first housing 211. The speaker module 220 may output sound signals to the outside of the wearable electronic device 200. For example, the speaker module 220 may output sound into the user's ears through a sound output path 225 and the ear tip 215. The speaker module 220 may include, for example, a speaker or a receiver.

The battery 230 (e.g., the battery 189 of FIG. 1) may be disposed in the z-axis direction of the speaker module 220. The battery 230 may supply power to at least one component of the wearable electronic device 200. For example, the battery 230 may supply power to the speaker module 220 and the printed circuit board 240.

In an embodiment, the printed circuit board 240 may be disposed in the z-axis direction of the battery 230. The printed circuit board 240 may include a wireless communication module (i.e. wireless communication circuitry) 245 (e.g., the wireless communication module 192 of FIG. 1) that transmits and/or receives wireless signals. The processor 120, the memory 130, the communication module 190, the sensor module 176, and/or the power management module 188 illustrated in FIG. 1 may be disposed on the printed circuit board 240. A ground part (e.g., a ground part 320 of FIG. 3) may be formed at one surface (e.g., back surface) of the printed circuit board 240.

Figure 3:
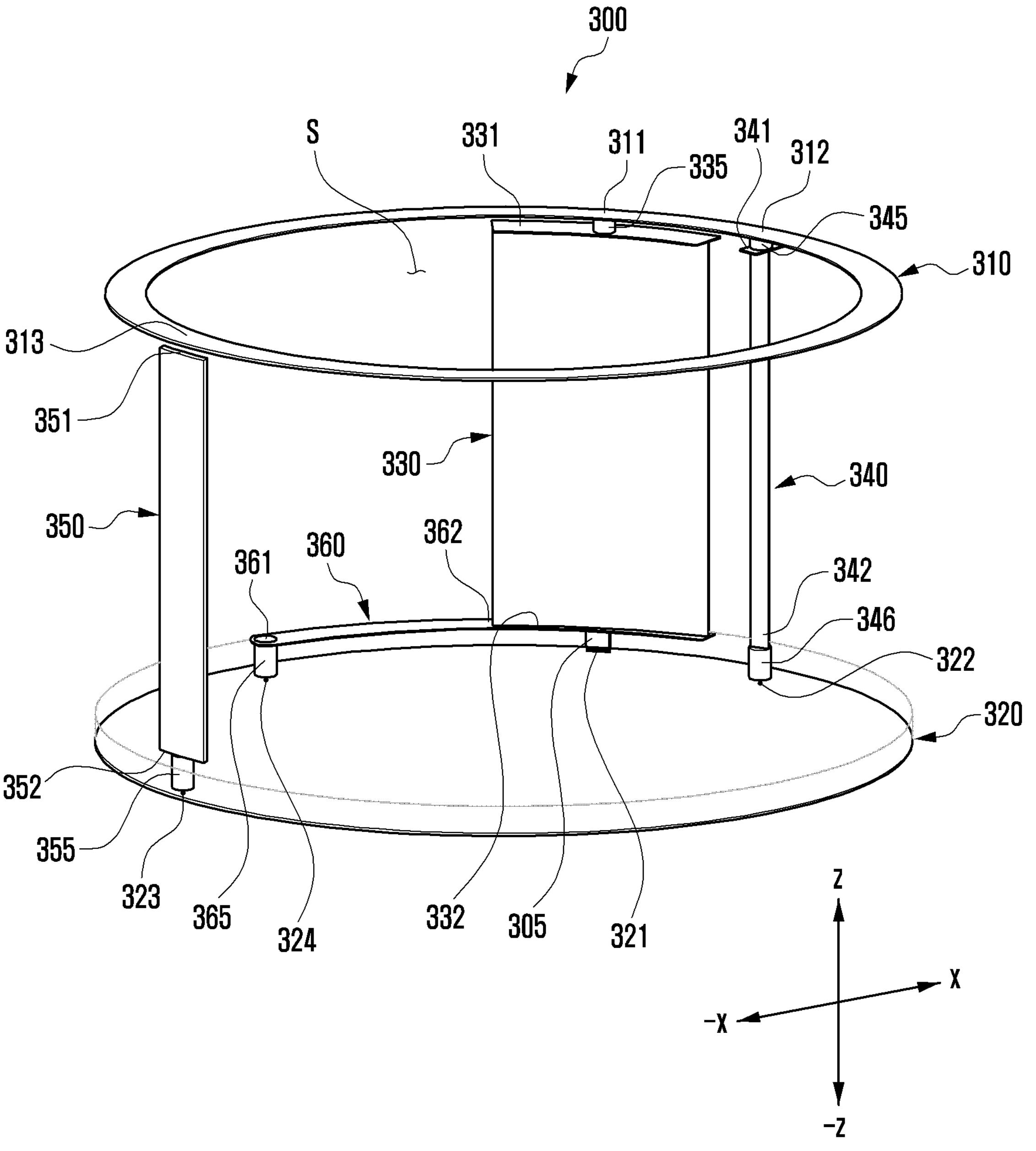
FIG. 3 is a diagram schematically illustrating a constitution of an antenna disposed in a wearable electronic device according to an embodiment of the disclosure.

FIG. 3 is a diagram schematically illustrating a constitution of an antenna disposed in a wearable electronic device according to an embodiment of the disclosure.

Figure 4:
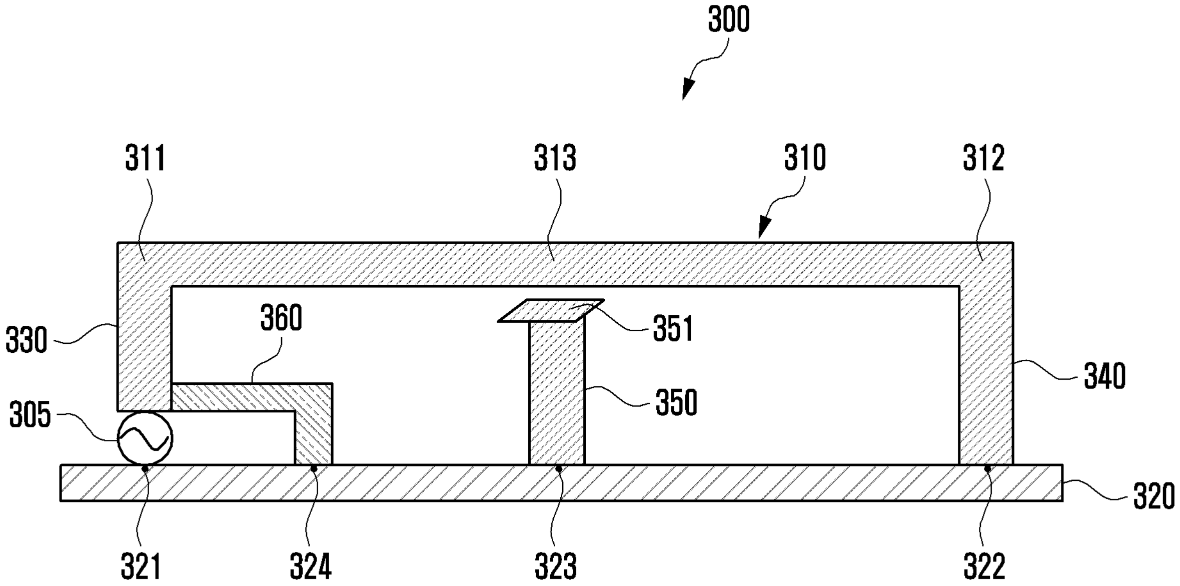
FIG. 4 is a diagram schematically illustrating an equivalent model of an antenna illustrated in FIG. 3 according to an embodiment of the disclosure.

FIG. 4 is a diagram schematically illustrating an equivalent model of an antenna illustrated in FIG. 3 according to an embodiment of the disclosure.

An antenna 300 (e.g., the antenna module 197 of FIG. 1) according to various embodiments of the disclosure may be disposed inside the housing 210 of the wearable electronic device 200 illustrated in FIG. 2. For example, the antenna 300 may be disposed between the printed circuit board 240 and the second housing 212 of the wearable electronic device 200. In one embodiment, the antenna 300 may be disposed between the printed circuit board 240 and the battery 230. The antenna 300 may operate in various frequency bands such as a Bluetooth frequency band (e.g., about 2.4 GHz to 2.5 GHz), a wireless fidelity (Wi-Fi) frequency band (e.g., about 5.1 GHz to 6.1 GHz), and/or an ultra wide band (UWB) frequency band (e.g., about 6.1 GHz to 11 GHz). The frequency band of the antenna 300 is not limited to the above-described example, and may transmit and receive signals in other frequency bands.

Referring to FIGS. 3 and 4, the antenna 300 may include a conductive pattern 310, a ground part 320, a feeding member 330, a short-circuit member 340, a capacitive loading member 350, and/or an impedance matching member 360.

In an embodiment, the conductive pattern 310 (e.g., antenna radiator) may be disposed at the first side (e.g., z-axis direction) of the antenna 300. The conductive pattern 310 may include a space S therein and be made of a conductive material in a substantially circular or oval shape. The conductive pattern 310 may be made of, for example, aluminum, copper, iron, chromium, or a combination of at least some of these materials.

According to other embodiments, the conductive pattern 310 may be electrically connected to the wireless communication module 245 through a feeding point 305 and/or the feeding member 330 disposed in the printed circuit board (e.g., the printed circuit board 240) and operate as an antenna radiator capable of transmitting or receiving wireless signals in a designated frequency band.

According to another embodiment, the ground part 320 (e.g., ground layer) may be disposed at the second side (e.g., −z-axis direction) of the antenna 300. The ground part 320 may be made of a conductive material in a substantially circular or oval shape. The ground part 320 may be disposed substantially parallel to the conductive pattern 310. The ground part 320 may face the conductive pattern 310. The ground part 320 may be disposed to be spaced apart from the conductive pattern 310 at regular intervals. In an embodiment, the ground part 320 may be formed at one surface (e.g., the back surface) of the printed circuit board 240.

In yet another embodiment, the feeding member 330 may be disposed between the conductive pattern 310 and the ground part 320. The feeding member 330 may electrically connect the conductive pattern 310 and the ground part 320. In the feeding member 330, at least a portion of a first part 331 may be electrically connected to a first point 311 of the conductive pattern 310, and at least a portion of a second part 332 may be electrically connected to a first point 321 of the ground part 320. The feeding member 330 may support the conductive pattern 310 to transmit and receive wireless signals. In an embodiment, the feeding member 330 may be formed in a curved plate-like shape. A width of the feeding member 330 may be wider than that of the short-circuit member 340 or the capacitive loading member 350.

According to some embodiments, at least a portion of the first part 331 of the feeding member 330 may be electrically connected to the first point 311 of the conductive pattern 310 using a first via 335 (e.g., conductive via). At least a portion of the first part 331 of the feeding member 330 may be electrically connected to the first point 311 of the conductive pattern 310 using a conductive connection member such as a C clip. At least a portion of the second part 332 of the feeding member 330 may be electrically connected to the first point 321 of the ground part 320 through the feeding point 305. The feeding point 305 may be, for example, electrically connected to the wireless communication module 245 disposed on the printed circuit board (e.g., the printed circuit board 240 of FIG. 2). The feeding point 305 may support the conductive pattern 310 to transmit and receive a wireless signal through the feeding member 330. The feeding point 305 may be electrically connected to the feeding member 330 and the ground part 320. For example, the feeding point 305 may be electrically connected to at least a portion of the second part 332 of the feeding member 330 and the first point 321 of the ground part 320, and form a potential difference between the ground part 320 and the feeding member 330.

The short-circuit member 340 may be disposed to be spaced apart from each other in the first direction (e.g., x-axis direction) of the feeding member 330. The short-circuit member 340 may be disposed between the conductive pattern 310 and the ground part 320. The short-circuit member 340 may electrically connect the conductive pattern 310 and the ground part 320. In the short-circuit member 340, a first part 341 may be electrically connected to a second point 312 of the conductive pattern 310, and a second part 342 may be electrically connected to a second point 322 of the ground part 320. The short-circuit member 340 may be electrically connected to the feeding member 330, the conductive pattern 310, and the ground part 320, and form an electrical path for the antenna 300. A main loop (e.g., a first loop antenna 505 of FIG. 5) may be formed through the feeding member 330, a portion of the conductive pattern 310, the short-circuit member 340, and the ground part 320, and the antenna 300 may operate in a designated frequency band. In an embodiment, the short-circuit member 340 may be formed in a curved plate-like shape. A width of the short-circuit member 340 may be narrower than that of the feeding member 330 or the capacitive loading member 350.

The first part 341 of the short-circuit member 340 may be electrically connected to the second point 312 of the conductive pattern 310 using a second via 345. At least a portion of the first part 341 of the short-circuit member 340 may be electrically connected to the second point 312 of the conductive pattern 310 using a conductive connection member such as a C clip. The second part 342 of the short-circuit member 340 may be electrically connected to the second point 322 of the ground part 320 using the third via 346. At least a portion of the second part 342 of the short-circuit member 340 may be electrically connected to the second point 322 of the ground part 320 using a conductive connecting member such as a C clip.

According to one embodiment, the capacitive loading member 350 may be disposed to be spaced apart from the feeding member 330 in the second direction (e.g., −x-axis direction). The capacitive loading member 350 may be disposed between the feeding member 330 and the short-circuit member 340. The capacitive loading member 350 may be disposed between the conductive pattern 310 and the ground part 320. The capacitive loading member 350 may electrically or operationally connect the conductive pattern 310 and the ground part 320. In an embodiment, in the capacitive loading member 350, a first part 351 may be operatively coupled to a third point 313 of the conductive pattern 310 through a coupling structure. In the coupling structure, the first part 351 of the capacitive loading member 350 may be not directly connected to the third point 313 of the conductive pattern 310 but be spaced apart from the third point 313 by a designated distance. The capacitive loading member 350 may adjust an amount of capacitance of the antenna 300. A second part 352 of the capacitive loading member 350 may be electrically connected to a third point 323 of the ground part 320. The capacitive loading member 350 may be, for example, operatively connected to the feeding member 330, at least a portion of the conductive pattern 310, and the ground part 320, and form an electrical path for the antenna 300. In an embodiment, the capacitive loading member 350 may form a first sub-loop (e.g., a second loop antenna 510 of FIG. 5) through the feeding member 330, at least a portion of the conductive pattern 310, and the ground part 320 and support the antenna 300 to operate in a designated frequency band. In another embodiment, the capacitive loading member 350 may form a second sub-loop (e.g., a third loop antenna 520 of FIG. 5) through at least a portion of the conductive pattern 310 and the ground part 320 and support the antenna 300 to operate in a designated frequency band. In an embodiment, the capacitive loading member 350 may be formed in a curved plate-like shape. A width of the capacitive loading member 350 may be narrower than that of the feeding member 330 and be wider than that of the short-circuit member 340.

According to some embodiments, the second part 352 of the capacitive loading member 350 may be electrically connected to the third point 323 of the ground part 320 using a fourth via 355. At least a portion of the second part 352 of the capacitive loading member 350 may be electrically connected to the third point 323 of the ground part 320 using a conductive connecting member such as a C clip.

According to another embodiment, the impedance matching member 360 may be disposed between the feeding member 330 and the capacitive loading member 350. The impedance matching member 360 may electrically connect the ground part 320 and the feeding member 330. The impedance matching member 360 may adjust an electrical length or path of the antenna 300. The impedance matching member 360 may adjust input impedance or resistance value of the antenna 300. The impedance matching member 360 may adjust the resonance frequency so that the antenna 300 supports various frequency bands.

According to various embodiments, a first part 361 of the impedance matching member 360 may be electrically connected to a fourth point 324 of the ground part 320. The first part 361 of the impedance matching member 360 may be electrically connected to the fourth point 324 of the ground part 320 using a fifth via 365. At least a portion of the first part 361 of the impedance matching member 360 may be electrically connected to the fourth point 324 of the ground part 320 using a conductive connection member such as a C clip. A second part 362 of the impedance matching member 360 may be, for example, electrically connected to a portion of the second part 332 of the feeding member 330. A portion of the impedance matching member 360 may be disposed to be spaced apart from the ground part 320.

Figure 5:
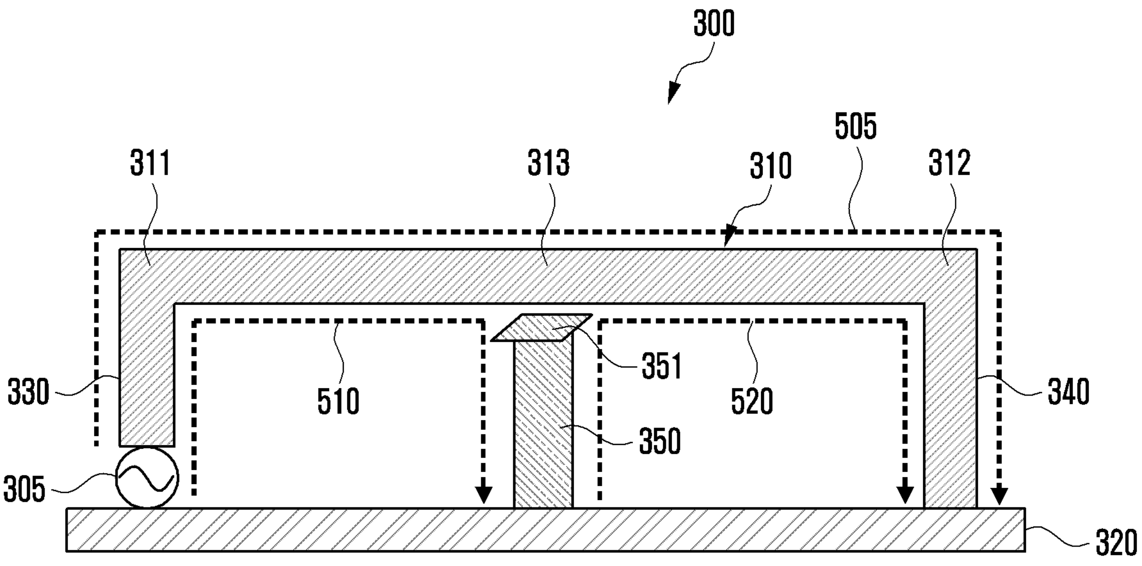
FIG. 5 is a diagram schematically illustrating an equivalent model illustrating an operation of an antenna according to an embodiment of the disclosure.

FIG. 5 is a diagram schematically illustrating an equivalent model illustrating an operation of an antenna according to an embodiment of the disclosure.

FIG. 5 is a diagram schematically illustrating an equivalent model in which the impedance matching member 360 is omitted from the antenna 300 illustrated in FIGS. 3 and 4.

According to an embodiment, in the antenna 300, the feeding point 305, the feeding member 330, the conductive pattern 310, the short-circuit member 340, and the ground part 320 may be electrically connected to each other and form an electrical path. The feeding point 305, the feeding member 330, at least a portion of the conductive pattern 310, the short-circuit member 340, and the ground part 320 may form a main loop and operate as a first loop antenna 505. The first loop antenna 505 may be formed to operate at a resonant frequency of 0.5 wavelength (λ), 1 wavelength, 1.5 wavelengths, and/or 2 wavelengths.

In an embodiment, in the antenna 300, the feeding point 305, the feeding member 330, a portion of the conductive pattern 310, the capacitive loading member 350, and the ground part 320 may be electrically connected to each other and form an electrical path. The feeding point 305, the feeding member 330, a portion of the conductive pattern 310, the capacitive loading member 350, and the ground part 320 may form a first sub-loop, and operate as a second loop antenna 510. The second loop antenna 510 may be formed to operate at a resonance frequency of 0.5 wavelength and/or 1 wavelength.

In another embodiment, in the antenna 300, the capacitive loading member 350, a portion of the conductive pattern 310, the short-circuit member 340, and the ground part 320 may be electrically connected to each other and form an electrical path. The capacitive loading member 350, a portion of the conductive pattern 310, the short-circuit member 340, and the ground part 320 may form a second sub-loop and operate as a third loop antenna 520. The third loop antenna 520 may be formed to operate at a resonance frequency of 0.5 wavelength and/or 1 wavelength.

According to various embodiments, the antenna 300 may operate in a Bluetooth (BT) frequency band (e.g., about 2.4 GHz to 2.5 GHz) using 0.5 wavelength of the first loop antenna 505 (e.g., main loop). The antenna 300 may operate in a wireless fidelity (Wi-Fi) frequency band (e.g., about 5.1 GHz to 6.1 GHz) using 1 wavelength of the first loop antenna 505 (e.g., main loop) and 0.5 wavelength of the third loop antenna 520 (e.g., second sub-loop). The antenna 300 may, for example, operate in an ultra wide band (UWB) frequency band (e.g., about 6.1 GHz to 11 GHz) using 1 wavelength, 1.5 wavelengths, and 2 wavelengths of the first loop antenna 505 (e.g., main loop), and 0.5 wavelength and 1 wavelength of the second loop antenna 510 (e.g., first sub loop), and 1 wavelength of the third loop antenna 520 (e.g., second sub-loop).

Figure 6:
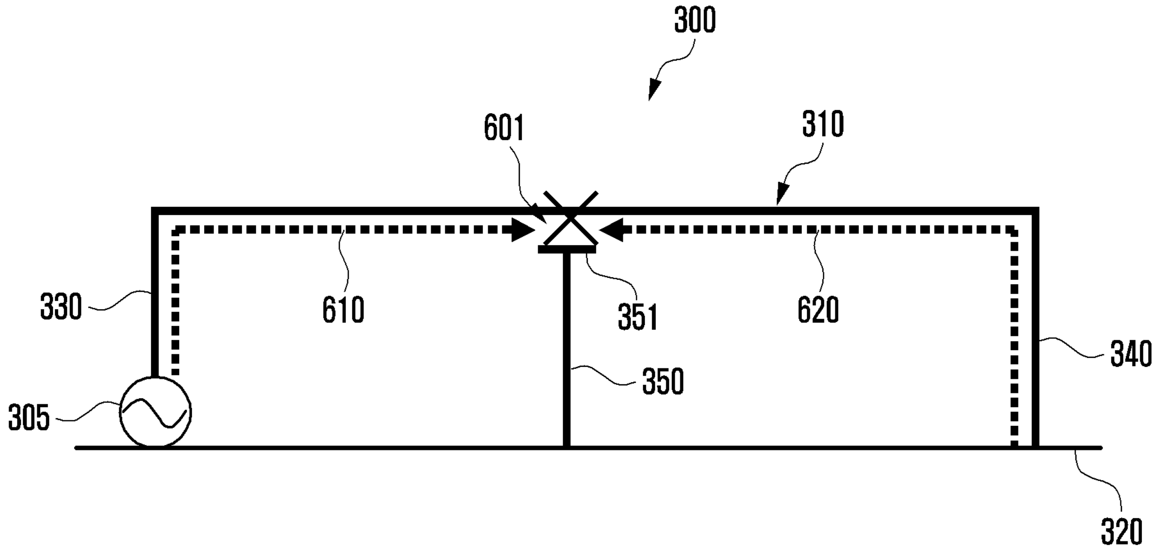
FIG. 6 is a diagram illustrating an embodiment of an equivalent model in which an antenna (e.g., first loop antenna) operates at 0.5 wavelength in a BT frequency band according to an embodiment of the disclosure.

FIG. 6 is a diagram illustrating an embodiment of an equivalent model in which an antenna (e.g., first loop antenna) operates at 0.5 wavelength in a BT frequency band according to an embodiment of the disclosure.

According to various embodiments, the antenna 300 illustrated in FIG. 6 (e.g., the first loop antenna 505 of FIG. 5) may operate at about 0.5 wavelength, in the Bluetooth (BT) frequency band (e.g., about 2.4 GHz to 2.5 GHz).

The antenna 300 may form a resonant frequency in a frequency band of about 2.45 GHz. The antenna 300 may have a first null point 601 at which the current flow is substantially 0 A/m at a designated point (e.g., the third point 313 of FIG. 3) of the conductive pattern 310. For example, the antenna 300 may operate at 0.5 wavelength in a frequency band of about 2.45 GHz using one first null point 601.

According to one embodiment, in the antenna 300, a main loop may be formed from the feeding point 305 through the feeding member 330, the conductive pattern 310, the short-circuit member 340, and the ground part 320, and a current from the feeding point 305 may be input and output. For example, when the antenna 300 operates in a frequency band of about 2.45 GHz, an electrical length of a first path 610 may be formed from the feeding point 305 to the first null point 601; thus, a current may flow, and an electrical length of a second path 620 may be formed from the short-circuit member 340 to the first null point 601; thus, a current may flow.

Figure 7:
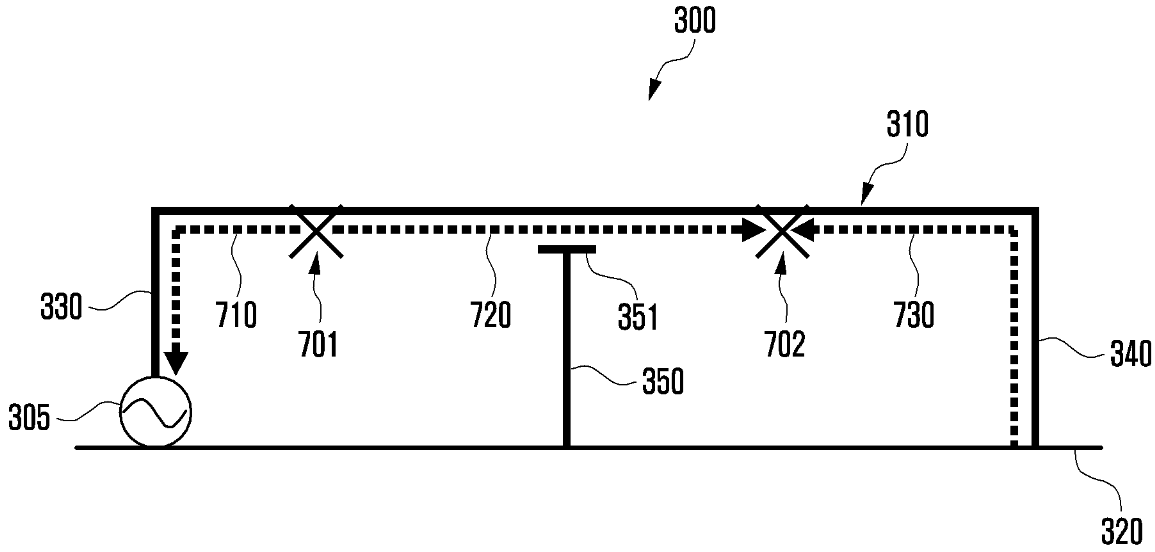
FIG. 7 is a diagram illustrating an embodiment of an equivalent model in which an antenna (e.g., first loop antenna) operates at 1 wavelength in a Wi-Fi frequency band according to an embodiment of the disclosure.

FIG. 7 is a diagram illustrating an embodiment of an equivalent model in which an antenna (e.g., first loop antenna) operates at 1 wavelength of a wireless fidelity (Wi-Fi) frequency band according to an embodiment of the disclosure.

According to various embodiments, the antenna 300 illustrated in FIG. 7 (e.g., the first loop antenna 505 of FIG. 5) may operate at 1 wavelength of a Wi-Fi frequency band (e.g., about 5.1 GHz to 6.1 GHz).

The antenna 300 may form a resonant frequency in a frequency band of about 5.13 GHz. The antenna 300 may have a first null point 701 and a second null point 702 at which the current flow is substantially 0 A/m at two designated points of the conductive pattern 310. In an example, the first null point 701 may be formed at a point of the conductive pattern 310 between the feeding member 330 and the capacitive loading member 350. The second null point 702 may be formed at a point of the conductive pattern 310 between the capacitive loading member 350 and the short-circuit member 340. For example, the antenna 300 may operate at 1 wavelength in a frequency band of about 5.13 GHz using the first null point 701 and the second null point 702.

According to another embodiment, when the antenna 300 operates in a frequency band of about 5.13 GHz, an electrical length of a first path 710 may be formed from the first null point 701 to the feeding point 305 through the conductive pattern 310 and the feeding member 330; thus, a current may flow, and an electrical length of a second path 720 may be formed from the first null point 701 to the second null point 702 through the conductive pattern 310; thus, a current may flow, and an electrical length of a third path 730 may be formed from the ground part 320 to the second null point 702 through the short-circuit member 340 and the conductive pattern 310; thus, a current may flow.

According to yet another embodiment, when the antenna 300 operates at 1 wavelength, an electric field may be formed as a current in the first path 710 and a current in the third path 730 are formed asymmetrically. A capacitance effect may be generated between the feeding member 330 and the short-circuit member 340 through the electric field formed by the current in the first path 710 and the current in the third path 730. Due to the capacitance effect, the impedance of the antenna 300 may be determined.

Figure 8:
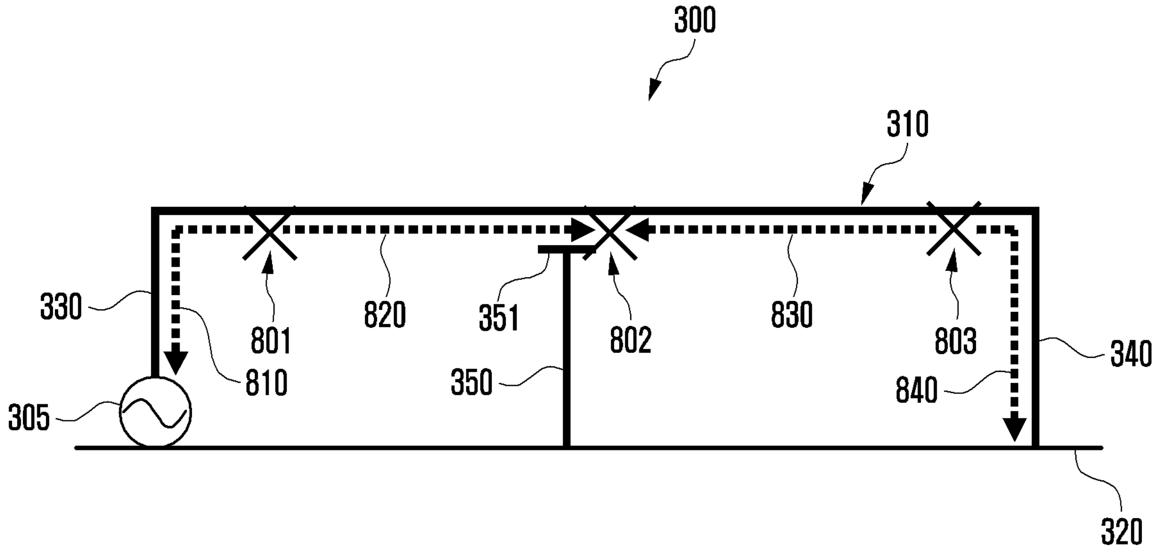
FIG. 8 is a diagram illustrating an embodiment of an equivalent model in which an antenna (e.g., first loop antenna) operates at 1.5 wavelengths in a UWB frequency band according to an embodiment of the disclosure.

FIG. 8 is a diagram illustrating an embodiment of an equivalent model in which an antenna (e.g., first loop antenna) operates at 1.5 wavelengths in a UWB frequency band according to an embodiment of the disclosure.

According to various embodiments, the antenna 300 illustrated in FIG. 8 (e.g., the first loop antenna 505 of FIG. 5) may operate in about 1.5 wavelengths in an ultra wide band (UWB) frequency band (e.g., about 6.1 GHz to 11 GHz).

In an embodiment, the antenna 300 may form a resonant frequency in a frequency band of about 6.75 GHz. The antenna 300 may have a first null point 801, a second null point 802, and a third null point 803 at which the current flow is substantially 0 A/m at three designated points of the conductive pattern 310. For example, the first null point 801 may be formed at a point of the conductive pattern 310 between the feeding member 330 and the capacitive loading member 350. The second null point 802 may be formed at a point of the conductive pattern 310 between the first null point 801 and the third null point 803. The third null point 803 may be formed at a point of the conductive pattern 310 between the second null point 802 and the short-circuit member 340. The antenna 300 may operate at 1.5 wavelengths in a frequency band of about 6.75 GHz using, for example, the first null point 801, the second null point 802, and the third null point 803.

In another embodiment, when the antenna 300 operates in a frequency band of about 6.75 GHz, an electrical length of a first path 810 may be formed from the first null point 801 to the feeding point 305 through the conductive pattern 310 and the feeding member 330; thus, a current may flow, and an electrical length of a second path 820 may be formed from the first null point 801 to the second null point 802 through the conductive pattern 310; thus, a current may flow, an electrical length of a third path 830 may be formed from the third null point 803 to the second null point 802 through the conductive pattern 310; thus, a current may flow, and an electrical length of a fourth path 840 may be formed from the third null point 803 to the conductive pattern 310, the short-circuit member 340, and the ground part 320; thus, a current may flow.

Figure 9:
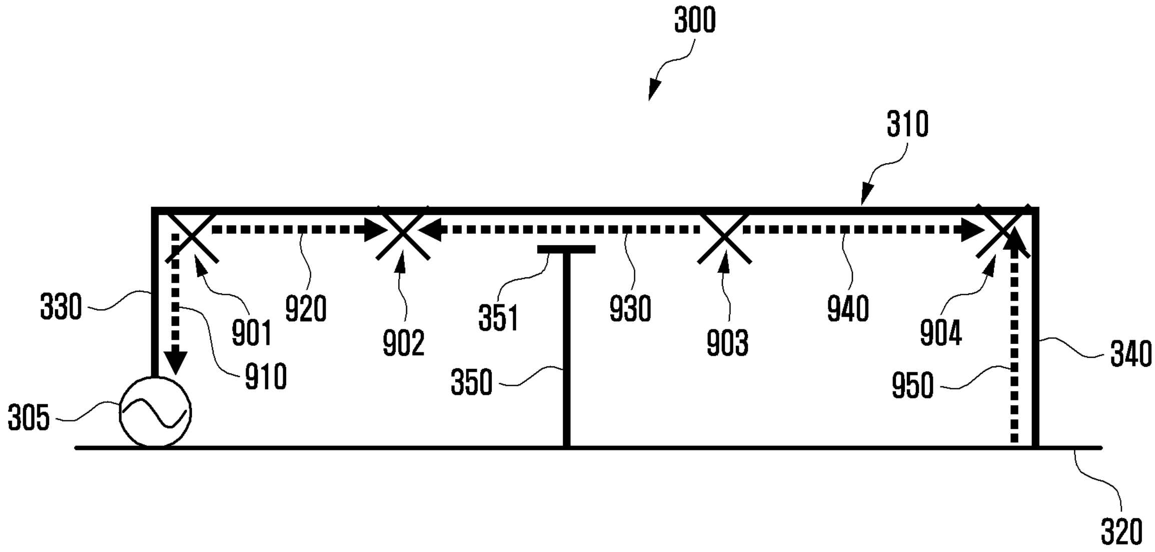
FIG. 9 is a diagram illustrating an embodiment of an equivalent model in which an antenna (e.g., first loop antenna) operates at 2 wavelengths in a UWB frequency band according to an embodiment of the disclosure.

FIG. 9 is a diagram illustrating an embodiment of an equivalent model in which an antenna (e.g., first loop antenna) operates at 2 wavelengths in a UWB frequency band according to an embodiment of the disclosure.

According to various embodiments, the antenna 300 illustrated in FIG. 9 (e.g., the first loop antenna 505 of FIG. 5) may operate in about 2 wavelengths in the ultra wide band (UWB) frequency band (e.g., about 6.1 GHz to 11 GHz).

The antenna 300 may form a resonant frequency in a frequency band of about 8.68 GHz. The antenna 300 may have a first null point 901, a second null point 902, a third null point 903, and a fourth null point 904 at which the current flow is substantially 0 A/m at four designated points of the conductive pattern 310. For example, the first null point 901 may be formed at a point of the conductive pattern 310 between the feeding member 330 and the capacitive loading member 350. The second null point 902 may be, for example, formed at a point of the conductive pattern 310 between the first null point 801 and the capacitive loading member 350. The third null point 903 may be formed at a point of the conductive pattern 310 between the capacitive loading member 350 and the short-circuit member 340. The fourth null point 904 may be formed at a point of the conductive pattern 310 between the third null point 903 and the short-circuit member 340. For example, the antenna 300 may operate at 2 wavelengths in a frequency band of about 8.68 GHz using the first null point 901, the second null point 902, the third null point 903, and the fourth null point 904.

When the antenna 300 operates in a frequency band of about 8.68 GHz, an electrical length of a first path 910 may be formed from the first null point 901 to the feeding point 305 through the conductive pattern 310 and the feeding member 330; thus, a current may flow, an electrical length of a second path 920 may be formed from the first null point 901 to the second null point 902 through the conductive pattern 310; thus, a current may flow, an electrical length of a third path 930 may be formed from the third null point 903 to the second null point 902 through the conductive pattern 310; thus, a current may flow, and an electrical length of a fourth path 940 may be formed from the third null point 903 to the fourth null point 904 through the conductive pattern 310; thus, a current may flow, and an electrical length of a fifth path 950 may be formed from the ground part 320 to the short-circuit member 340 and the fourth null point; thus, a current may flow.

Figure 10:
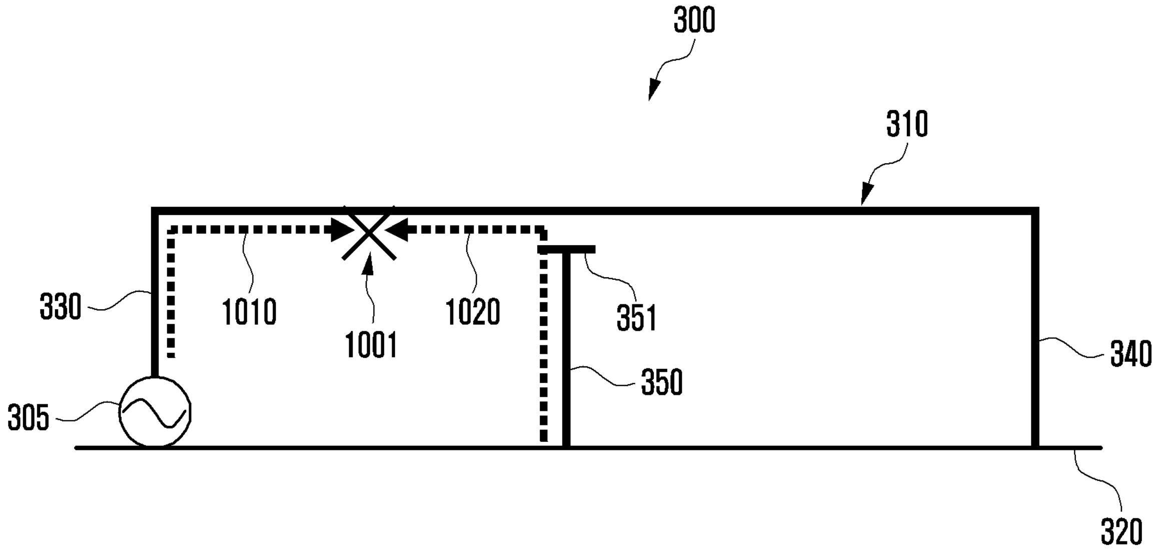
FIG. 10 is a diagram illustrating various embodiments of an equivalent model in which an antenna (e.g., second loop antenna) operates at 0.5 wavelength in a UWB frequency band according to an embodiment of the disclosure.

FIG. 10 is a diagram illustrating various embodiments of an equivalent model in which an antenna (e.g., second loop antenna) operates at 0.5 wavelength in a UWB frequency band according to an embodiment of the disclosure.

According to various embodiments, the antenna 300 illustrated in FIG. 10 (e.g., the second loop antenna 510 of FIG. 5) may operate in about 0.5 wavelength in the ultra wide band (UWB) frequency band (e.g., about 6.1 GHz to 11 GHz).

The antenna 300 may form a resonant frequency in a frequency band of about 8.25 GHz. The antenna 300 may have a first null point 1001 at which the current flow is substantially 0 A/m at one designated point of the conductive pattern 310. For example, the first null point 1001 may be formed at a point of the conductive pattern 310 between the feeding member 330 and the capacitive loading member 350. For example, the antenna 300 may operate at 0.5 wavelength in a frequency band of about 8.25 GHz using one first null point 1001.

According to another embodiment, in the antenna 300, a first sub-loop may be formed from the feeding point 305 through the feeding member 330, the conductive pattern 310, the capacitive loading member 350, and the ground part 320, and a current from the feeding point 305 may be input and output. For example, when the antenna 300 operates in a frequency band of about 8.25 GHz, an electrical length of a first path 1010 may be formed from the feeding point 305 to the first null point 1001 through the conductive pattern 310; thus, a current may flow, and an electrical length of a second path 1020 may be formed from the ground part 320 to the first null point 1001 through the capacitive loading member 350 and the conductive pattern 310; thus, a current may flow.

Figure 11:
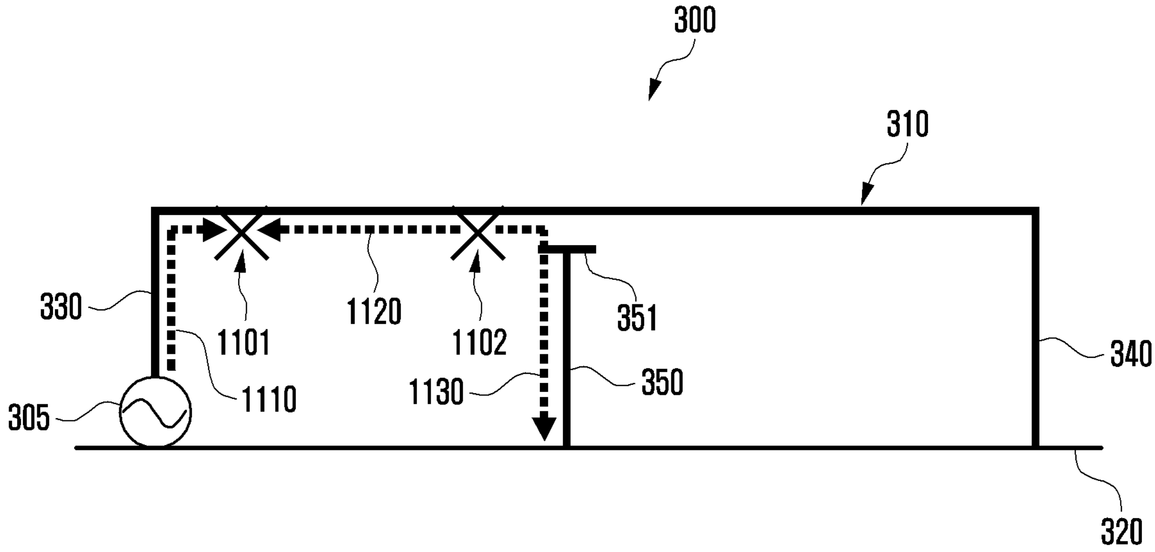
FIG. 11 is a diagram illustrating various embodiments of an equivalent model in which an antenna (e.g., second loop antenna) operates at 1 wavelength in a UWB frequency band according to an embodiment of the disclosure.

FIG. 11 is a diagram illustrating various embodiments of an equivalent model in which an antenna (e.g., second loop antenna) operates at 1 wavelength in a UWB frequency band according to an embodiment of the disclosure.

According to various embodiments, the antenna 300 illustrated in FIG. 11 (e.g., the second loop antenna 510 of FIG. 5) may operate in about 1 wavelength in the ultra wide band (UWB) frequency band (e.g., about 6.1 GHz to 11 GHz).

The antenna 300 may form a resonance frequency in a frequency band of about 10.67 GHz. The antenna 300 may have a first null point 1101 and a second null point 1102 at which the current flow is substantially 0 A/m at two designated points of the conductive pattern 310. For example, the first null point 1101 may be formed at a point of the conductive pattern 310 between the feeding member 330 and the capacitive loading member 350. The second null point 1002 may be formed at a point of the conductive pattern 310 between the first null point 1101 and the capacitive loading member 350. For example, the antenna 300 may operate at 1 wavelength in a frequency band of about 10.67 GHz using the first null point 1101 and the second null point 1102.

According to another embodiment, in the antenna 300, a first sub-loop may be formed from the feeding point 305 through the feeding member 330, the conductive pattern 310, the capacitive loading member 350, and the ground part 320, and a current from the feeding point 305 may be input and output. For example, when the antenna 300 operates in a frequency band of about 10.67 GHz, an electrical length of a first path 1110 may be formed from the feeding point 305 to the first null point 1101 through the conductive pattern 310; thus, a current may flow, an electrical length of a second path 1120 may be formed from the second null point 1102 to the first null point 1101 through the conductive pattern 310; thus, a current may flow, and an electrical length of a third path 1130 may be formed from the second null point 1102 to the ground part 320 through the conductive pattern 310 and the capacitive loading member 350; thus, a current may flow.

Figure 12:
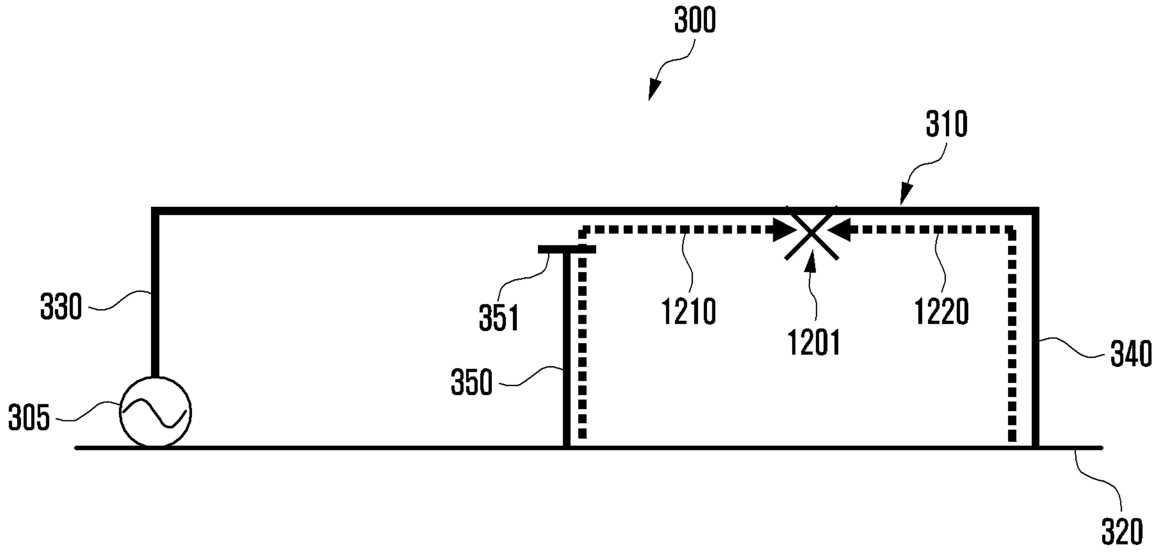
FIG. 12 is a diagram illustrating various embodiments of an equivalent model in which an antenna (e.g., third loop antenna) operates at 0.5 wavelength in a UWB frequency band according to an embodiment of the disclosure.

FIG. 12 is a diagram illustrating various embodiments of an equivalent model in which an antenna (e.g., third loop antenna) operates at 0.5 wavelength in a UWB frequency band according to an embodiment of the disclosure.

According to various embodiments, the antenna 300 illustrated in FIG. 12 (e.g., the third loop antenna 520 of FIG. 5) may operate in about 0.5 wavelength in the ultra wide band (UWB) frequency band (e.g., about 6.1 GHz to 11 GHz).

The antenna 300 may form a resonant frequency in a frequency band of about 5.78 GHz. The antenna 300 may have a first null point 1201 at which the current flow is substantially 0 A/m at a designated point of the conductive pattern 310. For example, the first null point 1201 may be formed at a point of the conductive pattern 310 between the capacitive loading member 350 and the short-circuit member 340. For example, the antenna 300 may operate at 0.5 wavelength in a frequency band of about 5.78 GHz using one first null point 1201.

In another embodiment, in the antenna 300, a second sub-loop may be formed through the capacitive loading member 350, the conductive pattern 310, the short-circuit member 340, and the ground part 320. For example, when the antenna 300 operates in a frequency band of about 5.78 GHz, an electrical length of a first path 1210 may be formed from the ground part 320 to the first null point 1201 through the capacitive loading member 350 and the conductive pattern 310; thus, a current may flow, and an electrical length of a second path 1220 may be formed from the ground part 320 to the first null point 1201 through the short-circuit member 340 and the conductive pattern 310; thus, a current may flow.

Figure 13:
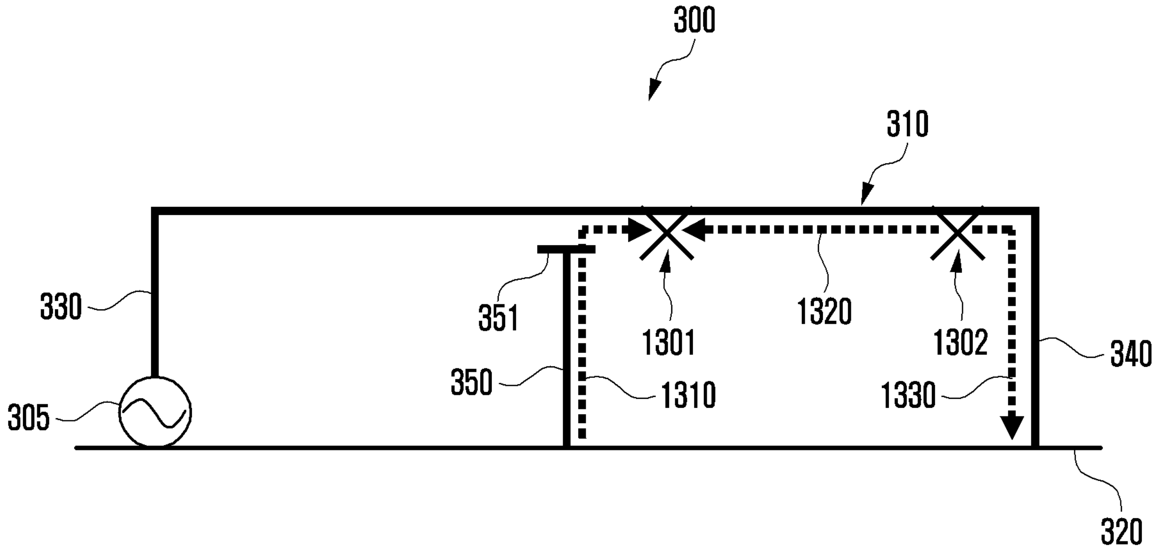
FIG. 13 is a diagram illustrating various embodiments of an equivalent model in which an antenna (e.g., second loop antenna) operates at 1 wavelength in a UWB frequency band according to an embodiment of the disclosure.

FIG. 13 is a diagram illustrating various embodiments of an equivalent model in which an antenna (e.g., second loop antenna) operates at 1 wavelength in a UWB frequency band according to an embodiment of the disclosure.

According to various embodiments, an antenna 300 illustrated in FIG. 13 (e.g., the third loop antenna 520 of FIG. 5) may operate in about 1 wavelength in the ultra wide band (UWB) frequency band (e.g., about 6.1 GHz to 11 GHz).

The antenna 300 may form a resonance frequency in a frequency band of about 9.03 GHz. The antenna 300 may have a first null point 1301 and a second null point 1302 at which the current flow is substantially 0 A/m at two designated points of the conductive pattern 310. For example, the first null point 1301 may be formed at a point of the conductive pattern 310 between the capacitive loading member 350 and the short-circuit member 340. The second null point 1302 may be formed at a point of the conductive pattern 310 between the first null point 1301 and the short-circuit member 340. For example, the antenna 300 may operate at 1 wavelength in a frequency band of about 9.03 GHz using the first null point 1301 and the second null point 1302.

According to another embodiment, in the antenna 300, a second sub-loop may be formed through the capacitive loading member 350, the conductive pattern 310, the short-circuit member 340, and the ground part 320. For example, when the antenna 300 operates in a frequency band of about 9.03 GHz, an electrical length of a first path 1310 may be formed from the ground part 320 to the first null point 1301 through the capacitive loading member 350 and the conductive pattern 310; thus, a current may flow, and an electrical length of a second path 1320 may be formed from the second null point 1302 to the first null point 1301 through the conductive pattern 310; thus, a current may flow, and an electrical length of the third path 1330 may be formed from the second null point 1302 to the ground part 320 through the conductive pattern 310 and the short-circuit member 340; thus, a current may flow.

Figure 14:
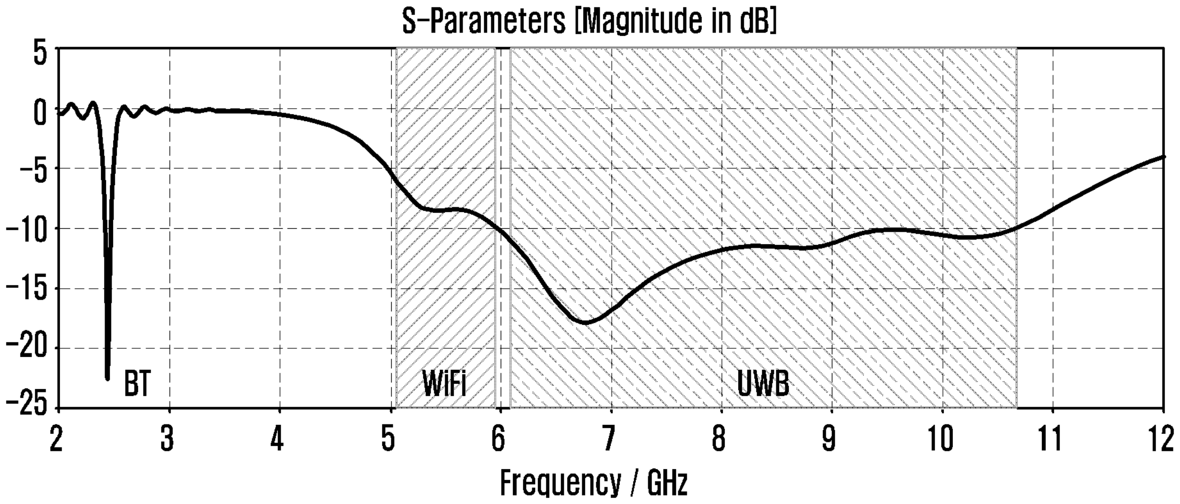
FIG. 14 is a graph illustrating a reflection loss of an antenna according to an embodiment of the disclosure.

FIG. 14 is a graph illustrating a reflection loss of an antenna according to an embodiment of the disclosure.

The antenna 300 according to various embodiments of the disclosure may operate in various frequency bands such as a Bluetooth (BT) frequency band (e.g., about 2.4 GHz to 2.5 GHz), a wireless fidelity (Wi-Fi) frequency band (e.g., about 5.1 GHz to 6.1 GHz), and an ultra wide band (UWB) frequency band (e.g., about 6.1 GHz to 11 GHz) using the first loop antenna 505 (e.g., main loop) and the second loop antenna 510 (e.g., first sub-loop), and the third loop antenna 520 (e.g., second sub-loop) illustrated in FIG. 5.

Referring to FIG. 14, the antenna 300 may identify that a reflection loss of −6 dB is satisfied in the BT frequency band of about 2.4 GHz to 2.48 GHz and the Wi-Fi frequency band of about 5.1 GHz to 5.8 GHz and that a reflection loss of −10 dB is satisfied in the UWB frequency band of about 6.1 GHz to 10.7 GHz.

A wearable electronic device 200 according to an embodiment of the disclosure may include a housing 210; a printed circuit board 240 disposed inside the housing and including a wireless communication module (i.e. wireless communication circuitry) 245 and a ground part 320; and an antenna 300 disposed inside the housing and electrically connected to the wireless communication circuitry, wherein the antenna 300 may include a conductive pattern 310; a feeding member 330 electrically connected to the wireless communication circuitry through a feeding point 305 and configured to electrically connect a first point 311 of the conductive pattern and a first point 321 of the ground part; a short-circuit member 340 configured to electrically connect a second point 312 of the conductive pattern and a second point 322 of the ground part; and a capacitive loading member 350 disposed between the feeding member and the short-circuit member and having a first part 351 operatively coupled to a third point 313 of the conductive pattern and a second part 352 electrically connected to a third point 323 of the ground part.

The antenna may further include an impedance matching member 360 disposed between the feeding member and the capacitive loading member, wherein in the impedance matching member, a first part 361 may be electrically connected to a fourth point 324 of the ground part, and a second part 362 may be electrically connected to a portion of the feeding member.

According to another embodiment, the antenna 300 may be configured to operate in a Bluetooth frequency band, a Wi-Fi frequency band, and/or an ultra wide band (UWB) frequency band.

According to yet another embodiment, the antenna 300 may be configured to form an electrical path through the feeding point, the feeding member, the conductive pattern, the short-circuit member, and the ground part, and to operate as a first loop antenna 505.

The first loop antenna may be configured to operate at a resonant frequency of 0.5 wavelength, 1 wavelength, 1.5 wavelengths, and/or 2 wavelengths.

In an embodiment, the antenna 300 may be configured to form an electrical path through the feeding point, the feeding member, a portion of the conductive pattern, the capacitive loading member, and the ground part, and to operate as a second loop antenna 510.

In another embodiment, the second loop antenna may be configured to operate at a resonance frequency of 0.5 wavelength and/or 1 wavelength.

In yet another embodiment, the antenna 300 may be configured to form an electrical path through the capacitive loading member, a portion of the conductive pattern, the short-circuit member, and the ground part, and to operate as a third loop antenna 520.

The third loop antenna may be configured to operate at a resonance frequency of 0.5 wavelength and/or 1 wavelength.

According to an embodiment, a width of the capacitive loading member may be narrower than that of the feeding member and be wider than that of the short-circuit member.

According to another embodiment, the feeding member 330 may be configured such that at least a portion of a first part 331 is electrically connected to a first point of the conductive pattern using a first via 335 and that at least a portion of a second part 332 is electrically connected to a first point of the ground part using the feeding point.

According to yet another embodiment, the short-circuit member 340 may be configured such that a first part 341 is electrically connected to a second point of the conductive pattern using a second via 345 and that a second part 342 is electrically connected to a second point of the ground part using a third via 346.

The capacitive loading member 350 may be configured such that the first part 351 is operatively coupled to a third point of the conductive pattern and that the second part 352 is electrically connected to a third point of the ground part using a fourth via 355.

According to an embodiment, the first part of the impedance matching member 360 may be electrically connected to a fourth point 324 of the ground part using a fifth via 365, and a portion of the impedance matching member may be disposed to be spaced apart from the ground part.

The antenna 300 according to an embodiment of the disclosure may include a feeding member 330 configured to electrically connect a conductive pattern 310, a ground part 320, a first point 311 of the conductive pattern, and a first point 321 of the ground part and to provide a wireless transmission and reception signal to the conductive pattern through a feeding point 305; a short-circuit member 340 configured to electrically connect a second point 312 of the conductive pattern, and a second point 322 of the ground part; and a capacitive loading member 350 disposed between the feeding member and the short-circuit member and having a first part 351 operatively coupled to a third point 313 of the conductive pattern and a second part 352 electrically connected to a third point 323 of the ground part.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device, comprising:

a housing;

a printed circuit board disposed inside the housing and including wireless communication circuitry and a ground part; and an antenna disposed inside the housing and electrically connected to the wireless communication circuitry, wherein the antenna comprises:

a conductive pattern, a feeding member electrically connected to the wireless communication circuitry through a feeding point and configured to electrically connect a first point of the conductive pattern and a first point of the ground part, a short-circuit member configured to electrically connect a second point of the conductive pattern and a second point of the ground part, and a capacitive loading member disposed between the feeding member and the short-circuit member and having a first part operatively coupled to a third point of the conductive pattern and a second part electrically connected to a third point of the ground part using a via.

2. The wearable electronic device of claim 1, wherein the antenna further comprises an impedance matching member disposed between the feeding member and the capacitive loading member, and wherein the impedance matching member has a first part electrically connected to a fourth point of the ground part and a second part electrically connected to a portion of the feeding member.

3. The wearable electronic device of claim 2, wherein the impedance matching member is configured such that the first part is electrically connected to a fourth point of the ground part using a fifth via and that a portion of the impedance matching member is disposed to be spaced apart from the ground part.

4. The wearable electronic device of claim 1, wherein the antenna is configured to operate in at least one of a Bluetooth frequency band, a Wi-Fi frequency band, or an ultra wide band (UWB) frequency band.

5. The wearable electronic device of claim 1, wherein the antenna is configured to form an electrical path through the feeding point, the feeding member, the conductive pattern, the short-circuit member, and the ground part, and to operate as a first loop antenna.

6. The wearable electronic device of claim 5, wherein the first loop antenna is configured to operate at a resonant frequency of 0.5 wavelength, 1 wavelength, 1.5 wavelengths, and/or 2 wavelengths.

7. The wearable electronic device of claim 1, wherein the antenna is configured to form an electrical path through the feeding point, the feeding member, a portion of the conductive pattern, the capacitive loading member, and the ground part, and to operate as a second loop antenna.

8. The wearable electronic device of claim 7, wherein the second loop antenna is configured to operate at a resonant frequency of 0.5 wavelength and/or 1 wavelength.

9. The wearable electronic device of claim 1, wherein the antenna is configured to form an electrical path through the capacitive loading member, a portion of the conductive pattern, the short-circuit member, and the ground part, and to operate as a third loop antenna.

10. The wearable electronic device of claim 9, wherein the third loop antenna is configured to operate at a resonance frequency of 0.5 wavelength and/or 1 wavelength.

11. The wearable electronic device of claim 1, wherein a width of the capacitive loading member is narrower than that of the feeding member and is wider than that of the short-circuit member.

12. The wearable electronic device of claim 1, wherein the feeding member is configured such that at least a portion of a first part is electrically connected to a first point of the conductive pattern using a first via and that at least a portion of a second part is electrically connected to a first point of the ground part using the feeding point.

13. The wearable electronic device of claim 1, wherein the short-circuit member is configured such that a first part is electrically connected to a second point of the conductive pattern using a second via and that a second part is electrically connected to a second point of the ground part using a third via.

14. An antenna, comprising:

a conductive pattern;

a ground part;

a feeding member configured to electrically connect a first point of the conductive pattern and a first point of the ground part and to provide a wireless transmission and reception signal to the conductive pattern through a feeding point;

a short-circuit member configured to electrically connect a second point of the conductive pattern and a second point of the ground part; and a capacitive loading member disposed between the feeding member and the short-circuit member and having a first part operatively coupled to a third point of the conductive pattern and a second part electrically connected to a third point of the ground part using a via.

15. The antenna of claim 14, further comprising an impedance matching member disposed between the feeding member and the capacitive loading member, wherein the impedance matching member has a first part electrically connected to a fourth point of the ground part and a second part electrically connected to a portion of the feeding member.

16. The antenna of claim 14, further comprising:

an electrical path formed through the feeding point, the feeding member, the conductive pattern, the short-circuit member, and the ground part to operate as a first loop antenna.

17. The antenna of claim 16, wherein the first loop antenna is configured to operate at a resonant frequency of 0.5 wavelength, 1 wavelength, 1.5 wavelengths, and/or 2 wavelengths.

18. The antenna of claim 14, further comprising: an electrical path formed through the feeding point, the feeding member, a portion of the conductive pattern, the capacitive loading member, and the ground part to operate as a second loop antenna.

19. The antenna of claim 18, wherein the second loop antenna is configured to operate at a resonant frequency of 0.5 wavelength and/or 1 wavelength.

* * * * *